United States Patent [19]

Norton et al.

[11] 4,118,006
[45] Oct. 3, 1978

[54] SOCKET ASSEMBLY

[75] Inventors: James F. Norton, Berea; Richard J. Silagy, Parma, both of Ohio

[73] Assignee: The Hansen Manufacturing Company, Cleveland, Ohio

[21] Appl. No.: 746,393

[22] Filed: Dec. 1, 1976

[51] Int. Cl.$^2$ .............................................. F16L 37/28
[52] U.S. Cl. ................................................. 251/149.6
[58] Field of Search ............... 251/149.4, 149.5, 149.6, 251/149.7

[56] References Cited

U.S. PATENT DOCUMENTS

| | | | |
|---|---|---|---|
| 3,280,834 | 10/1966 | Zanhoranec | 251/149.6 X |
| 3,378,225 | 4/1968 | Snyder, Jr. | 251/149.6 |
| 3,715,099 | 2/1973 | Shendure | 251/149.6 X |
| 3,788,598 | 1/1974 | German et al. | 251/149.6 |
| 3,836,114 | 9/1974 | Norton et al. | 251/149.6 |
| 3,861,645 | 1/1975 | Norton | 251/149.6 |

*Primary Examiner*—William R. Cline

[57] ABSTRACT

A coupling for connecting a pair of conduits in fluid communication includes an improved socket assembly having a body in which a valve member is movable axially between a closed position and an open position. The valve member is releasably held in the closed position by a plurality of locking elements which engage a recess in the valve member. When a plug is inserted into the socket assembly, the locking elements move out of engagement with the valve member and into engagement with the plug to hold it against axial movement relative to the socket assembly. In order to enable the socket assembly to be utilized with plugs of different sizes, the chamber in the valve member is provided with a cylindrical outer section having a relatively large diameter to engage a relatively large diameter leading end portion of a first plug and a relatively small diameter inner section to engage the smaller diameter and axially longer leading end portion of a second plug. A seal is located between the two sections of the valve member and is effective to sealingly engage both plugs. A second seal is provided in the socket body to sealingly engage the valve member when it is both in the open and closed positions to prevent fluid leakage around the valve. This second seal is disposed in a recess formed by walls of different sizes. Although both walls of the recess may be integrally formed with a socket body section, in one embodiment of the invention the downstream wall of the recess is formed by a flat annular washer which is clamped in place between threaded base and outer end sections of the socket body.

38 Claims, 7 Drawing Figures

SOCKET ASSEMBLY

BACKGROUND OF THE INVENTION

This invention relates generally to a socket assembly which cooperates with a plug to connect a pair of conduits in fluid communication.

A known socket assembly which is utilized in association with a plug to connect a pair of conduits in fluid communication is disclosed in U.S. Pat. No. 3,052,261. A socket assembly disclosed in this patent has a valve member which telescopically receives the leading end portion of a plug and is moved from a closed position to an open position by the plug as the plug is inserted into a socket body. A plurality of detent balls are provided to hold the plug in the socket body. When this known socket assembly is disconnected, the valve member is held against movement to the open position by only a biasing spring and can be easily opened. In addition, the valve member is designed for use in association with plugs of one particular size and cannot accommodate plugs having leading end portions which are of different diameters and axial lengths.

Various other known socket assemblies are disclosed in U.S. Pat. Nos. 3,715,099; 3,613,726; 3,532,101; 2,931,668; 2,461,700; 2,456,045 and 2,449,938. At least one or more of the various socket assemblies disclosed in these patents utilize O-ring seals to engage plug elements, locking balls to engage a valve member, and threaded connections between parts of the socket assembly.

BRIEF SUMMARY OF THE PRESENT INVENTION

The present invention provides a new and improved socket assembly having a valve member which is held in a closed position to prevent inadvertent actuation of the valve member by a plug before the plug is engaged by a seal. Upon insertion of a plug into the socket assembly, the valve member is moved to the open position and the plug is locked against axial movement relative to the socket assembly. The same locking elements are utilized to perform the dual functions of holding the valve member in a closed position against premature opening and holding the plug in the socket assembly. By utilizing the same elements to perform these dual functions of holding both the valve member and plug, the construction of the socket assembly is simplified. In one specific preferred embodiment of the invention the locking elements are held in engagement with the valve member and the plug by a sleeve which is movable axially relative to the socket body.

The socket valve member is provided with a central chamber which telescopically receives a leading end portion of the plug. To enable the socket assembly to be utilized with plugs having leading end portions of different diameters and axial lengths, the chamber in the valve member has an outer portion defined by a cylindrical surface having a first diameter and an inner portion defined by a cylindrical surface having a second diameter which is somewhat smaller than the first diameter. Upon insertion into the socket assembly of a plug having a leading end portion of a relatively large diameter and short axial extent, the leading end portion of the plug moves into engagement with the seal member and is held against sidewise movement by the relatively large diameter outer portion of the valve member. When a plug having a leading end portion with a relatively small diameter and large axial extent is inserted into the chamber in the valve member, the leading end of the plug moves past the seal into engagement with the relatively small diameter cylindrical inner surface which holds the plug against sidewise movement. Thus, by providing the socket valve member with a chamber having an outer portion of one diameter and an inner portion of a smaller diameter with a seal between the two portions of the chamber, plugs of different dimensions can be accommodated.

A second seal ring may be provided to prevent leakage of fluid between the valve element and the socket body. This second seal is advantageously disposed in a recess having a relatively small upstream side wall so that adequate fluid flow is obtained if the valve member is moved to a partially open position. To facilitate assembly, the downstream wall of the recess may be formed by a separate member. This wall member is clamped between socket body parts which are threaded together.

Accordingly, it is an object of this invention to provide a new and improved socket assembly which receives a plug to connect a conduit associated with the socket assembly in fluid communication with a conduit associated with the plug and wherein the same elements are utilized to detain a valve member in the socket assembly in a closed position during insertion of the plug to ensure sealing engagement of the leading end of the plug with the valve and to hold the plug against axial movement relative to the socket assembly after the plug has been inserted into the socket assembly and the valve member moved to the open position.

Another object of the invention is to provide a new and improved socket assembly which can be utilized in association with either a plug element having a leading end portion with a first axial length and first diameter or a plug element having a leading end portion with a second axial length which is greater than the first axial length and a second diameter which is less than the first diameter and wherein the socket assembly includes a valve member which telescopically receives the leading ends of the plug elements and has a chamber with an outer portion of a relatively large diameter and an inner portion of a relatively small diameter for cooperation with the different size plug elements and a seal disposed between the inner and outer portion of the chamber to sealingly engage the leading end of the relatively short plug element and a portion of the relatively long plug element which is spaced from the leading end face of the long plug element.

Another object of the invention is to provide a new and improved socket assembly for receiving a plug element to connect a conduit associated with the socket assembly in fluid communication with a conduit associated with the plug element and wherein the socket assembly includes a wall member which is clampingly held between an internally threaded base section of the socket assembly and an externally threaded outer section of the socket assembly.

BRIEF DESCRIPTION OF THE DRAWINGS

The following and other objects and features of the present invention will become more apparent upon consideration of the following description taken in connection with the accompanying drawings wherein.

DESCRIPTION OF SPECIFIC PREFERRED EMBODIMENTS OF THE INVENTION

Figure 1:
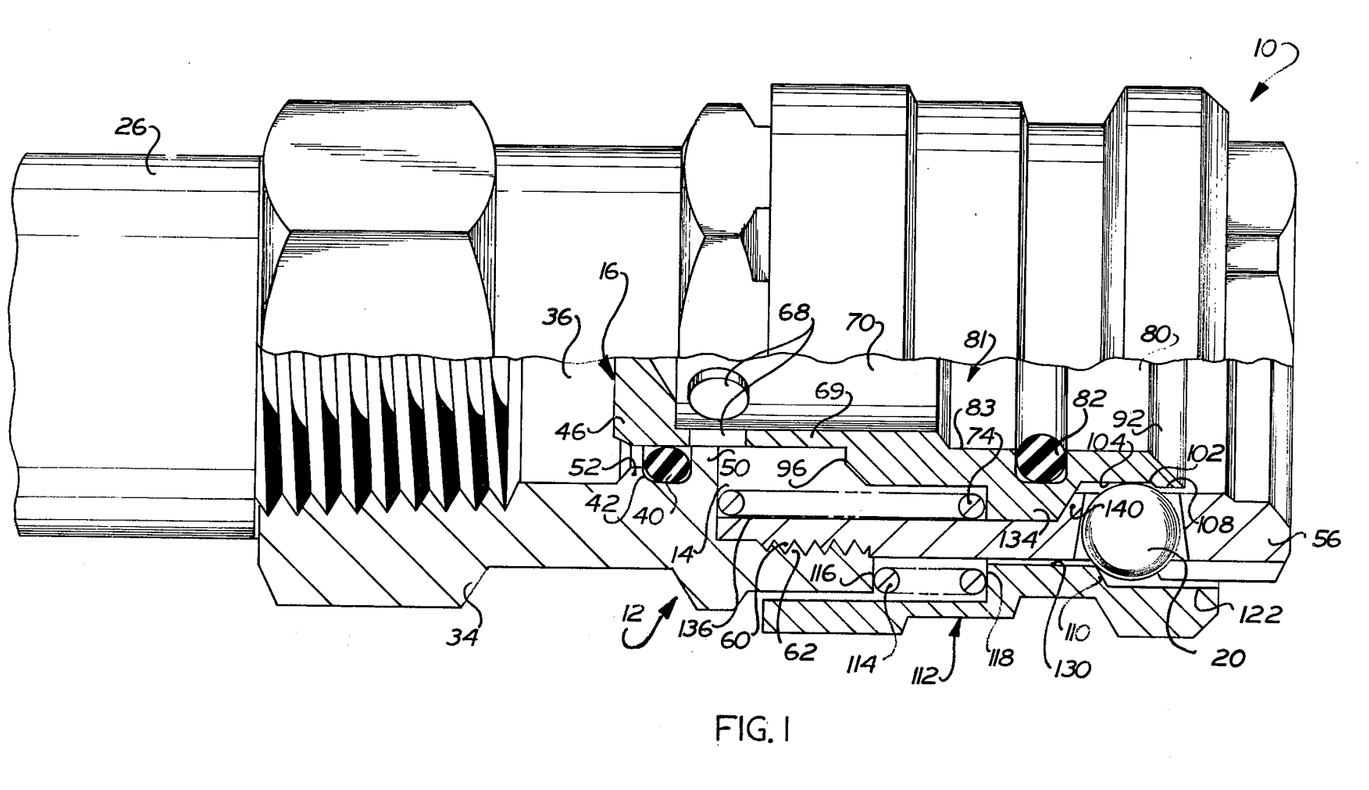
FIG. 1 is an enlarged fragmentary sectional view of a socket assembly constructed in accordance with the present invention.

A socket assembly 10 constructed in accordance with the present invention is illustrated in FIG. 1. The socket assembly 10 includes a socket body 12 which defines a generally cylindrical valve chamber 14. A valve member 16 is disposed in a coaxial relationship with the valve body 12 and is axially movable between a closed position (illustrated in FIG. 1) blocking fluid flow through the socket assembly 10 and an open position (illustrated in FIG. 2) in which fluid can flow through the socket assembly.

Figures 2, 3:
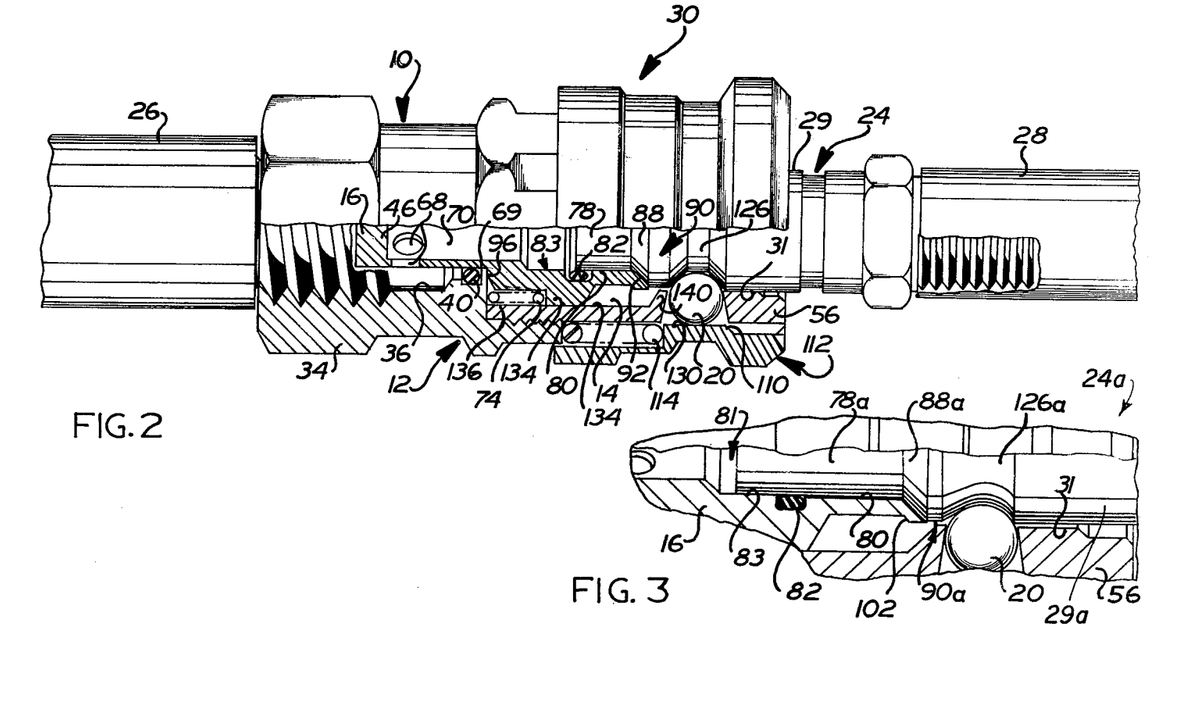
FIG. 2 is a fragmentary sectional view, on a reduced scale, depicting the socket assembly of FIG. 1 in association with a plug to connect a pair of conduits in fluid communication.
FIG. 3 is a fragmentary sectional view of the socket assembly of FIG. 1 with a second plug having a leading end portion which is axially longer and diametrically smaller than the plug of FIG. 2.

In accordance with a feature of the present invention, a plurality of locking elements or balls 20 are utilized to releasably hold the valve member 16 in the closed position to prevent inadvertent movement of the valve member to the open position. Upon insertion of a plug element 24 into the socket assembly 12 to connect a pair of conduits 26 and 28 (see FIG. 2) of a coupling 30 in fluid communication, the valve member 16 is automatically released and the locking balls 20 engage the plug element 24 to hold it in the valve chamber 14. Thus, the same locking balls 20 are utilized to perform the dual functions of holding the valve member 16 in the closed position and of holding the plug 24 in the socket assembly 12. Although only one locking or detent ball 20 is shown in FIGS. 1 and 2, it should be understood that a plurality of equally spaced locking balls 20 are utilized.

The socket body 12 has a base section 34 which is connected with the conduit 26. The base section 34 of the socket body 12 has a cylindrical fluid entry chamber 36 through which fluid under pressure flows from the conduit 26. When the valve member 16 is in either the closed position of FIG. 1 or the open position of FIG. 2, an annular seal ring 40 disposed in a groove 42 in the base portion 34 of the socket body 12 sealingly engages a cylindrical head end portion 46 of the valve member to prevent the leakage of fluid between the valve member and the socket body 12.

Figure 6:
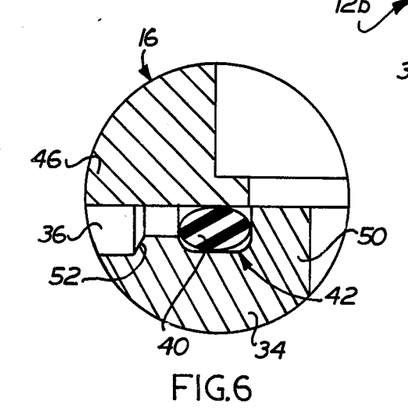
FIG. 6 is an enlarged fragmentary sectional view depicting the relationship of a seal ring to the valve member when the valve member is in the closed position of FIG. 1.

The recess 42 is provided with an annular support wall 50 (FIG. 6) on the downstream side. The upstream side of the recess 42 is provided with an annular entry wall 52 having a larger diameter opening therethrough than does the support wall 50. The relatively large diameter opening in the wall 52 provides adequate fluid flow space when the valve member 16 is moved to an open position short of the fully open position of FIG. 2. This enables the valve member 16 to be opened by plugs having different axial dimensions. Since the seal 40 is supported by the downstream wall 50 having the relatively smaller diameter opening therethrough to accommodate the valve member 16, the fluid pressure against the seal 40 presses the elastomeric seal into firm sealing engagement with both the head end portion 46 of the valve member 16 and the wall 50 to prevent the leakage of fluid between the socket body 12 and the valve member regardless of the extent of axial movement of the valve 16. It should be noted that the fluid pressure is effective to assure that a fluid tight seal is obtained between the valve member 16, socket wall 50 and seal ring 40 when the valve member is in either the closed position of FIG. 1 or the open position of FIG. 2.

In addition to the base 34, the socket body 12 is provided with a generally cylindrical outer end section 56 (see FIG. 1). The outer end section 56 has an external thread convolution 60 which engages an internal thread convolution 62 on the base 34 of the socket body 12. The internal thread convolution 62 extends inwardly from an open end of the base section toward the wall 50 which is coaxial with the thread convolutions 60 and 62. The threaded connection between the base 34 and outer end portion 56 of the socket body facilitates initial assembly and subsequent repair of the socket assembly 10.

When the valve member 16 is in the open position of FIG. 2, fluid can flow from the conduit 26 through circular openings 68 in a cylindrical valve wall 69 of the valve member 16. As the fluid flows through the openings 68 it enters a cylindrical flow passage 70 formed within the valve member 16. The fluid flows from the passage 70 into the plug 24 and from there to the conduit 28.

When the socket assembly 10 is in the disconnected condition of FIG. 1, the valve member 16 is urged to the closed position under the influence of fluid pressure on the head end portion 46 of the valve member and by a coil biasing spring 74. When the valve member 16 is in the closed position, the seal 40 is disposed axially inwardly of the openings 68 and blocks fluid flow from the conduit 26 through the openings 68 in the valve member in the manner illustrated in FIGS. 1 and 6. It should be understood that although only two openings 68 are illustrated in FIGS. 1 and 2, additional openings may be disposed in a circular array in the valve body. In one specific instance, six circular openings 68 were provided.

When the plug 24 is inserted into the socket body 12, a cylindrical leading end portion 78 (see FIG. 2) of the plug 24 enters diametrically enlarged axially outer cylindrical portion 80 (see FIGS. 1 and 2) of a chamber 81 in the valve member 16. The extent of diametrical enlargement of the portion 80 of the chamber 81 with respect to a coaxial cylindrical inner portion 83 is relatively small. In one specific illustrative embodiment of the invention the diameter of the cylindrical outer portion 80 of the chamber 81 had a diameter which was approximately 0.006 inches larger than the diameter of the cylindrical inner portion 83 of the chamber 81.

As the leading end portion 78 of the plug 24 enters the valve member 16, an annular seal ring 82 on the valve member 16 sealingly engages a cylindrical outer surface 84 (see FIG. 4) at the leading end of the plug 24. The seal ring 82 prevents the leakage of fluid between the plug 24 and the cylindrical inner surface of the valve member 16, and is sealingly engaged by the plug 24 prior to axial movement of the valve 16. At this time the plug 24 is held against sidewise movement by engagement with a cylindrical surface 31 (FIG. 2).

Figure 4:
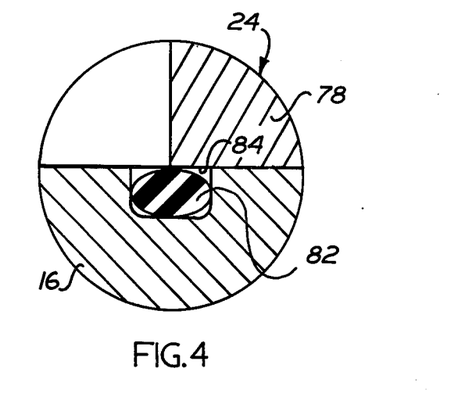
FIG. 4 is an enlarged fragmentary and sectional view illustrating the manner in which a seal within a movable valve member of the socket assembly engages the leading end of the plug of FIG. 2.
Figure 5:
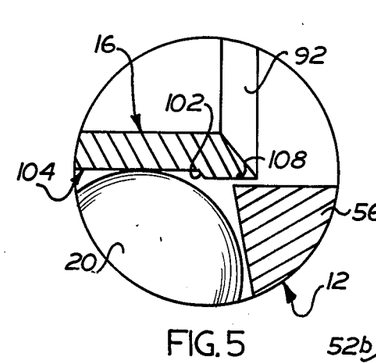
FIG. 5 is an enlarged fragmentary sectional view illustrating the manner in which a locking element engages a groove formed in the valve member of the socket assembly to releasably hold the valve member against axial movement when the valve member is in the closed position of FIG. 1.

When the leading end of the plug 24 is in the position illustrated in FIG. 4, a frustoconical leading side surface 88 (FIG. 2) of an annular shoulder 90 on the plug 24 has moved into engagement with a frustoconical end surface 92 on the valve member 16. Still further inward movement of the plug 24 causes the valve member 16 to be shifted axially from the closed position of FIG. 1 toward the fully open position of FIG. 2. As this movement of the valve member 16 occurs, the locking balls 20 are disengaged and the valve member is moved against the influence of the biasing spring 74 and under the influence of forces transmitted to the frustoconical outer end surface 92 of the valve member 16 by the shoulder 90 on the plug 24. Of course, the seal ring 82 moves with the valve member 16 to maintain tight sealing engagement with the leading end 78 of the plug 24. The axially inward movement of the valve 16 is limited by engagement of an annular shoulder 96 (see FIG. 1) on the valve member with the downstream face of the annular groove wall 50. Although axial movement is limited by the wall 50, it is not essential to operation of the socket assembly 10 that valve 16 move axially toward wall 50 any more than necessary to connect the chamber 36 in fluid communication with the openings 68 in the valve 16 around the wall 52. Thus, plugs 24 having different axial dimensions can be utilized to activate the valve member 16.

Prior to insertion of the plug 24, the socket assembly 10 is in the disconnected condition of FIG. 1. At this time the locking elements 20 engage an annular shoulder or camming ramp 102 formed as one wall of an annular recess 104 in an axially outer portion of the valve member 16 (see FIGS. 1 and 4). The cylindrical bottom surface of the groove 104 (FIG. 4) is engaged by the spherical outer surfaces of the locking elements 20.

The locking elements 20 are pressed against the cylindrical bottom of the annular groove 104 in the valve member 16 by a frustoconical cam surface 110 on the inside of a cylindrical sleeve 112. The sleeve 112 is pressed against the locking balls 20 by the spring 114. Thus, the locking balls 20 engage the valve member 16 to hold it in the closed position of FIG. 1. The valve member 16 is urged toward the closed position under the combined influence of the spring 74 and fluid pressure in the chamber 36. Therefore the valve member 16 cannot be readily opened by inadvertently pressing an object against the valve member.

When the plug 24 is to be connected with the socket assembly 10, an axial force is applied against the valve member 16 by the annular shoulder 90 on the plug. When this axial force is sufficient to overcome the line pressure effect, if any, the bias of spring 74 and spring 114, the valve member 16 moves axially inwardly. Inward movement of the valve member 16 causes the circumferential shoulder 102 on the valve member to cam the balls 20 outwardly enough to allow the shoulder 102 to pass between the balls 20.

As the locking balls 20 are forced outwardly, the sleeve 112 is moved toward the left, as viewed in FIG. 1, against the bias of spring 114 to accommodate the radially outward displacement of the balls 20 in an annular recess 122 formed in the sleeve.

The locking sleeve 112 is provided with first and second internal cylindrical surfaces 112 and 130 joined by the sloping ramp or frustoconical surface 110. Upon axial movement of the sleeve 112, the surfaces 122, 110 and 130 coact with the locking balls 20. When the sleeve 112 is retracted, that is moved leftwardly from the position shown in FIG. 1, the balls 20 engage cylindrical surface 122 and are out of holding engagement with the valve 16. When the sleeve 112 is in the holding position illustrated in FIG. 1, the balls 20 rest on the ramp 110, and extend a first distance into the valve chamber 14. At this time the locking balls engage the valve member 16 behind the ramp 102 on the surface 104. When the sleeve 112 is in the locking position shown in FIG. 2, the balls 20 engage the cylindrical surface 130 of the sleeve and extend their greatest distance into valve chamber 14. This enables the balls 20 to hold the plug 24 against axial movement by engagement with the groove 126.

When the valve member 16 is in the closed position, the locking elements 20 are pressed against the bottom surface of the groove 104, behind the shoulder 102 by the frustoconical ramp 110 formed on the inside of a generally cylindrical locking sleeve 112 (see FIG. 1). To facilitate the outward camming action above described, the shoulders 102 and 110 should contact the ball 20 in an "over center" relation being circumferentially closer together on the radially inward side of the balls 20, than on the radially outward side. The locking sleeve 112 is urged against the spherical outer surface of the locking balls 20 under the influence of a coil spring 114 disposed between an annular outer surface 116 of the base portion 34 of the socket body 12 and an annular inner surface 118 on the inside of the locking sleeve 112. This axially outwardly directed force on the valve sleeve 112 causes the ramp 110 to press the locking balls 20 firmly against the cylindrical bottom surface of the groove 104 and behind the shoulder 102.

It should be noted that with the arrangement shown in FIG. 1, the locking sleeve 112 is maintained in a partially retracted position on the socket assembly by the valve 16. The shoulder 102 adjacent the recess 104 holds the locking balls 20 on the cylindrical surface 122. The shoulders 102 of the valve 16, and 110 of the sleeve 112 are so related that the sleeve 112 is held in a partially retracted position against the bias of spring 114 until the plug 24 is inserted into the valve 16. The sleeve 112 is then cammed toward the left (as viewed in FIG. 1) under the influence of the axial force applied against the valve member 16 and transmitted to the sleeve 112 by the locking balls 20. When this occurs, the leading end of the plug 24 is in engagement with the seal ring 82 to prevent the leakage of fluid from the socket assembly 10.

When the valve 16 has been moved to the open position by the plug 24, an annular groove 126 behind the shoulder 90 is moved axially into alignment with the locking balls 20. The biasing spring 114 then causes the locking sleeve to move axially outwardly. As this occurs, the locking balls 20 are cammed radially inwardly into engagement with the annular groove 126 in the plug 24. The locking balls 20 are held in engagement with the groove 126 by the cylindrical inner surface 130 formed on the inside of the sleeve 112. It should be noted that at this time the balls 20 extend further into the valve chamber 14 then when the valve member 16 is in closed position since the diameter of the surface 130 is less than the diameter of the outer end portion 122 of the sleeve 112. This provides a relatively firm engagement between the balls 20 and the plug 24 to prevent the plug from being pulled out of the socket assembly 10 under the influence of forces applied to the conduits 26 and 28.

Thus, the sleeve 112 cooperates with the valve 16 and plug 24 to effect movement of the locking elements 20 between three distinct positions; that is, a disengaged position in which the locking elements 20 are disposed outside of the valve chamber 14 and are received in the relatively large diameter outer end portion 122 of the sleeve, a first engaged position in which the locking elements 20 extend a relatively short distance into the valve chamber 14 into engagement with the recess 104 in the valve member 16, and a second engaged position in which the locking elements extend further into the valve chamber 14 into engagement with the groove 126 in the plug 24. When the locking elements 20 are in either one of the two engaged positions, the stepped portions 122 and 130 of the sleeve 112 hold the locking balls 20 against outward movement to the disengaged position. Thus, when the locking elements 20 are in engagement with the recess 104 in the valve 16 (see FIG. 1), the shoulder 110 on the sleeve 112 under the bias of spring 114 releasably holds the locking elements against radially outward movement. When the locking elements 20 are in engagement with the groove 126 in the plug 24, the cylindrical inner surface 130 on the sleeve 112 locks the locking elements against outward movement.

The valve member 16 is provided with an annular outer rim 134 which is disposed in sliding engagement with a cylindrical inner surface 136 of the socket body 12. The annular rim 134 cooperates with the socket body surface 136 to guide movement of the valve member 16 between the closed position of FIG. 1 and the open position of FIG. 2. In addition, the annular rim 134 on the valve member 16 engages an annular rim 140 on the socket body to limit outward movement of the valve member (see FIG. 1). It should be noted that the threaded connection between the outer section 56 and the base section 34 of the socket body 12 enables the annular rim 134 on the valve member 16 to be trapped between the annular rim 140 on the outer portion 56 of the socket body and the radial wall 50 on the base portion 34 of the socket body during initial assembly of the socket assembly 10.

As indicated above, the socket assembly 10 is adapted for use with plugs of different size. The socket assembly 10 is illustrated in FIG. 3 in association with a plug having an axially longer and diametrically smaller leading end portion. Since the plug of FIG. 3 is similar to the plug 24 of FIG. 2, similar numerals have been utilized to identify similar components. The suffix letter "a" is being associated with the plug of FIG. 3 to avoid confusion.

The plug 24a has a cylindrically leading end portion 78a which is axially longer than the leading end portion 78 of the plug 24. Thus, when the plug 24a is inserted into the chamber 81 formed in the valve member 16, the leading end portion of the plug 24a extends past the seal 82 into the relatively small diameter cylindrical inner portion 83 of the chamber 81. The relatively small diameter portion 83 of the chamber 81 is sized to have a sliding fit with the leading end portion 78a of the plug 24a to thereby hold the plug 24a against sidewise movement relative to the socket assembly. It should be noted that the relatively large diameter cylindrical outer surface 80 is spaced apart from the nose portion 78a of the plug 24a.

When the plug 24a is inserted into the socket assembly 10 it cooperates with the locking balls 20 and sleeve 112 in the same manner as previously explained in connection with the plug 24. Thus, as the leading end portion 78a moves into the valve chamber 81, it will move past the seal 82 until the annular shoulder 90a on the plug 24a engages the outer end surface of the valve member 16. The axial force of the plug against the valve member 16 is then effective to cause the cam surface 102 to cam the locking balls 20 radially outwardly to shift the sleeve 112 axially inwardly and release the valve member 16 for axial movement from the closed position to the open position. When the valve member 16 has been moved to the open position, the locking balls 20 are cammed inwardly by the sleeve 112 into engagement with the annular recess 126a formed in the plug 24a.

It is contemplated that the two plugs 24 and 24a could have many different diametrical and axial dimensions. In any case, the outer cylindrical surface 80 is sized for a sliding fit with the leading end portion 78 of the plug 24 to hold the plug 24 against sidewise movement while the cylindrical inner surface 83 is sized for a sliding fit with the cylindrical surface of the relatively long leading end 78a of the plug 24a. In order to provide for engagement of the seal 82 with the plug 24, the groove in which the seal 82 is located must be in the position between the two cylindrical surfaces 80 and 83 at a location where it will be engaged by the leading end of the plug 24 in the manner illustrated in FIG. 2.

In one specific embodiment of the invention, the socket assembly 10 was provided with a valve member having a cylindrical axially outer surface 80 with a diameter of approximately 0.322 inches while the cylindrical axially inner surfacd 83 was formed with a diameter of approximately 0.316 inches. The groove in which the seal 82 is located had a width of approximately 0.083 inches and was located with a center approximately 0.250 inches from the outer end face of the valve member. The plug 24 had a leading end portion 78 with a length of approximately 0.214 inches as measured from the leading end of the plug to the beginning of the 45° cam surface 88 on the shoulder 90 and a diameter of approximately 0.317 inches. When so sized, the 45° slope of the surface 88 on the shoulder 90 and the 45° slope of the end face 92 on the valve member 16 cooperated to enable the leading end of the plug to engage the seal 82 in the manner illustrated in FIG. 4. The second plug had leading end portion with a length of approximately 0.322 inches and a diameter of approximately 0.310 inches. When the second plug 24a was inserted into the coupling assembly, the leading end of the plug extended past the seal member 82 so that the seal member engaged the leading end portion 78a at a location spaced from the leading end of the plug in the manner illustrated in FIG. 3.

It should be understood that the foregoing dimensions are for specific embodiments of the valve 16 and the plugs 24 and 24a. These dimensions are set forth herein merely for purposes of clarity of illustration. It is contemplated that the socket assembly 10 will be constructed with valve members of many different size for use in association with plugs of many different sizes. However, by constructing the valve 16 in the manner set forth herein, the versatility of the socket assembly 10 is enhanced since it can be utilized with two different plugs having leading end portions of different sizes.

The acceptance of the different plug designs represented by plugs 24 and 24a, for example, having different dimensions, such as indicated, is accomplished without sacrificing sealing capability. This is effected by differeing diameters at 80 and 83 in valve 16 and in the socket portion 56 so that either plug 24 or 24a is supported adequately to resist side loading and prevent seal leakage at low pressures.

Figure 7:
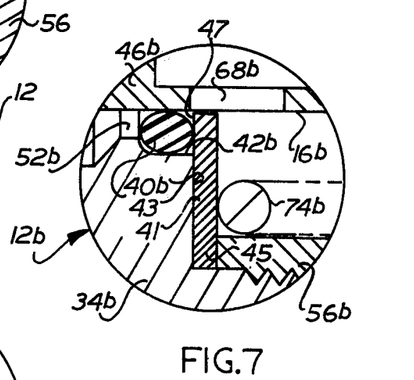
FIG. 7 is an enlarged fragmentary sectional view, similar to FIG. 6, of a second embodiment of the socket assembly in which a wall member is clamped between a pair of socket body sections.

FIG. 7 shows a modification of the structure of FIGS. 1 and 2 in respect of the recess 42 containing O-ring seal 40. Corresponding parts of this modification have been like numbered and further identified with the letter b. Instead of an integral wall 50 as shown in FIGS. 1 and 2, the socket body 12b may be counterbored. A separate rigid sealing wall member 41, e.g., a brass, bronze or nylon washer 41 internally dimensioned for axial sliding movement of valve 16b relative thereto, is utilized to form the downstream wall 47 of the recess 42b. Such a member 41 is inserted at the time socket portions 34b and 56b are secured together and clamped between the confronting portions thereof.

The major outer portion of the washer 41 is flush with the counterbore surface 43 of the socket portion 24 and is clamped in position by the inner end 45 of the threaded socket member 56 with the spring 74b bearing thereagainst. The upstream side of the minor inner portion of the washer 41 forms the downstream wall 47 of the recess 42b.

Although the invention has been described in its preferred form wherein the lip or shoulder 102 is a detent relative to locking balls 20 and overridden by axially applied force, it is contemplated herein that the valve 16 may be positively locked by said lip or shoulder and released only by axial movement of the locking sleeve a distance sufficient to move the locking balls 20 to the fully released position on the cylindrical surface 122 instead of such members 20 being cammed only partly down the ramp 110 far enough to clear the shoulder 102.

In view of the foregoing description it can be seen that the present invention provides a new and improved socket assembly 10 having a valve member 16 which is held in a closed position (FIG. 1) to prevent inadvertent actuation of the valve member during insertion of the plug 24 and overcoming of the friction of the internal seal ring 82. Upon insertion of a plug 24 into the socket assembly 10 and abutment of the face 88 of rim 90 against the throat 92 of valve 16, the valve member 16 is moved to the open position (FIG. 2) and the plug 24 is locked against axial movement relative to the socket assembly. The same locking elements 20 are utilized to perform the dual functions of holding the valve member 16 in a closed position and holding the plug 24 in the socket assembly, and the construction of the socket assembly 10 is simplified. In one specific preferred embodiment of the invention the locking elements 20 are held in engagement with the valve member 16 and the plug by the single sleeve 112 which is movable axially relative to the socket body 12.

Sealing means coact between the plug 24 and the valve 16, and to this end the valve member 16 may advantageously be provided with an internal seal ring 82 which engages a leading end 78 of the plug 24 to prevent the leakage of fluid between the valve member and the plug. If desired, a second seal ring 40 may be provided to prevent leakage of fluid between the valve element 16 and the socket body 12. This second seal ring 40 is advantageously disposed in a recess 42 having a relatively small upstream side wall 52 so that in the event the axial dimensions of the plug 24 are such that axial movement of the valve 16 incompletely exposes the openings 68 to the chamber 36, adequate fluid flow is nevertheless maintained. To facilitate assembly, the socket body 12 may be made up of parts 34 and 56 which are connected by threads 60 and 62.

Having described one specific preferred embodiment of the invention, the following is claimed:

1. A socket assembly for receiving a plug element to connect a conduit associated with said socket assembly in fluid communication with a conduit associated with the plug element, said socket assembly comprising a socket body adapted to be connected with a conduit and defining a valve chamber having an outer end portion through which the plug element is inserted, a valve member disposed in said valve chamber and movable axially inwardly in said valve chamber from a closed position blocking fluid flow through said valve chamber to an open position enabling fluid to flow through said valve chamber, said valve member being movable axially outwardly in said valve chamber from the open position to the closed position, biasing means for applying an axially outwardly directed biasing force to said valve member urging said valve member toward the closed position, and locking means for engaging said valve member and holding it against axially inward movement under the influence of an axially inwardly directed force which is greater than said biasing force when said valve member is in the closed position and for engaging the plug element and holding it against axial movement when said valve member is in the open position.

2. A socket assembly as set forth in claim 1 further including sealing means mounted on said valve member for sealingly engaging said plug element when said plug element is received in said socket assembly.

3. A socket assembly in accordance with claim 1 wherein said valve member includes a circumferential shoulder at its outer end for coaction with said locking means.

4. A socket assembly as set forth in claim 1 wherein said locking means includes a plurality of ball elements disposed in a circular array in openings in said socket body, each of said ball elements being movable relative to said socket body to a disengaged condition in which each of said ball elements is ineffective to hold said valve member in the closed position and in which each of said ball elements is ineffective to hold the plug element against axial movement, each of said ball elements being movable relative to said socket body to a first engaged condition in which each of said ball elements is in abutting engagement with said valve member and is effective to hold said valve member in the closed position against the influence of axially inward forces applied to said valve member, each of said ball elements being movable relative to said socket body to a second engaged condition in which each of said ball elements is in abutting engagement with the plug element and is effective to hold the plug element against axially inward movement relative to the socket body.

5. A socket assembly as set forth in claim 4 wherein said locking means further includes a sleeve circumscribing the circular array of ball elements, said sleeve being axially movable relative to said socket body to a first locking condition in which said sleeve is effective to hold said ball elements in said first engaged condition, said sleeve being axially movable relative to said socket body to a second locking condition in which said sleeve is effective to hold said ball elements in said second engaged condition, said sleeve being movable relative to said socket body to an unlocking condition in which said sleeve is ineffective to hold said ball elements in an engaged condition.

6. A socket assembly as set forth in claim 4 wherein said ball elements are disposed outwardly of said valve chamber when said ball elements are in said disengaged condition, said ball elements extending a first distance into said valve chamber when said ball elements are in said first engaged condition, said ball elements extending a second distance into said valve chamber when said ball elements are in said second engaged condition, said second distance being greater than said first distance.

7. A socket assembly as set forth in claim 6 wherein said locking means further includes a sleeve circumscribing the circular array of ball elements, said sleeve being movable relative to said socket body to a first position in which said sleeve is ineffective to press said ball elements into said valve chamber to enable said ball elements to move to said disengaged condition, said sleeve being movable relative to said socket body to a second position in which said sleeve is effective to hold said ball elements in positions in which they extend said first distance into valve chamber, said sleeve being movable relative to said socket body to a third position in which said sleeve is effective to hold said ball elements in positions in which they extend said second distance into said valve chamber.

8. A socket assembly as set forth in claim 7 wherein said sleeve includes cylindrical surfaces of first and second diameters for coaction with said ball elements and sloping ramp means joining said cylindrical surfaces, said first diameter corresponding to said first position, said ramp means corresponds to said second position and said second diameter corresponds to said third position.

9. A socket assembly as set forth in claim 1 wherein said valve member includes a body having an outer surface means for defining an annular recess having a bottom surface of a first diameter and shoulder which extends outwardly from said bottom surface to a second diameter which is greater than said first diameter, said shoulder being disposed axially outwardly of and coaxial with said bottom surface, said locking means including detent means for engaging said shoulder to hold said valve member against movement from the closed position to the open position.

10. A socket assembly as set forth in claim 9 further including seal means disposed within said valve member for sealingly engaging a leading end portion of the plug element.

11. A socket assembly as set forth in claim 9 wherein said annular recess includes a sloping camming ramp between said bottom surface and the outer diameter of said shoulder, said camming ring being effective to disengage said locking elements from said valve member upon the application of an inwardly directed force to said valve member by the plug element.

12. A socket assembly as set forth in claim 1 further including seal means coacting between said valve member and said socket body.

13. A socket assembly as set forth in claim 12 wherein said seal means is a resilient ring member disposed in a recess in said socket body for sealing engagement between said recess and said valve member in response to fluid pressure in said conduit associated with said socket assembly.

14. A socket assembly for use in association with either a first plug element having a cylindrical leading end portion with a first axial length and a first diameter or a second plug element having a cylindrical leading end portion with a second axial length which is greater than the first axial length and a second diameter which is less than the first diameter, said socket assembly comprising a socket body adapted to be connected with a conduit and defining a first chamber having an open outer end portion through which either one of the first and second plug elements can be inserted, a valve member disposed in said first chamber and movable axially inwardly from a closed position blocking fluid flow through said first chamber to an open position enabling fluid to flow through said first chamber, said valve member including inner surface means for defining a second chamber having an open outer end portion through which the leading end portion of either one of the first and second plug elements can be inserted in telescopic relationship with said valve member, said inner surface means including a first cylindrical surface disposed adjacent to said open outer end portion of said second chamber and having a third diameter which is greater than the first diameter and a second cylindrical surface disposed axially inwardly of and spaced apart from said first cylindrical surface and having a fourth diameter which is greater than the second diameter and is smaller than the third diameter, circular seal means disposed between an axially innner end of said first cylindrical surface and an axially outer end of said second cylindrical surface for sealingly engaging the axially outer end of the leading end portion of the first plug element when said first plug element is inserted into said second chamber and for sealingly engaging a portion of the leading end portion of the second plug element at a location spaced apart from the axially outer end of the second plug element when the second plug element is inserted into said second chamber, said first cylindrical surface cooperating with the leading end portion of the first plug element to limit sidewise movement of the first plug element relative to said socket assembly, said second cylindrical surface cooperating with the leading end portion of the second plug element to limit sidewise movement of the second plug element relative to the socket assembly.

15. A socket assembly as set forth in claim 14 wherein the axial length of said second chamber is greater than the axial length of the leading end portion of the second plug element.

16. A socket assembly as set forth in claim 15 further including locking means for engaging said valve member and holding it against axial movement when said valve member is in the closed position and for engaging either one of the plug elements and holding the one plug element against axial movement when said valve member is in the open position.

17. A socket assembly as set forth in claim 14 further including locking means for engaging said valve member and holding it against axial movement when said valve member is in the closed position and for engaging either one of the plug elements and holding the one plug element against axial movement when said valve member is in the open position.

18. A socket assembly as set forth in claim 17 wherein said locking means includes a plurality of ball elements disposed in a circular array in openings in said socket body, each of said ball elements being movable relative to said socket body to a disengaged condition in which each of said ball elements is ineffective to hold said valve member in the closed position and in which each of said ball elements is ineffective to hold the one plug element against axial movement, each of said ball elements being movable relative to said socket body to a first engaged condition in which each of said ball elements is in abutting engagement with said valve member and is effective to hold said valve member in the closed position against the influence of axial forces applied to said valve member, each of said ball elements being movable relative to said socket body to a second engaged condition in which each of said ball elements is in abutting engagement with the one plug element and is effective to hold the one plug element against axial movement relative to the socket body.

19. A socket assembly as set forth in claim 18 wherein said locking means further includes a sleeve circumscribing the circular array of ball elements, said sleeve being axially movable relative to said socket body to a first locking condition in which said sleeve is effective to hold said ball elements in said first engaged condition, said sleeve being axially movable relative to said socket body to a second locking condition in which said sleeve is effective to hold said ball elements in said second engaged condition, said sleeve being movable relative to said socket body to an unlocking condition in which said sleeve is ineffective to hold ball elements in an engaged condition.

20. A socket assembly as set forth in claim 18 wherein said ball elements are disposed outwardly of said first chamber when said ball elements are in said disengaged condition, said ball elements extending a first distance into said first chamber when said ball elements are in said first engaged condition, said ball elements extending a second distance into said first chamber when said ball elements are in said second engaged condition, said second distance being greater than said first distance.

21. A socket assembly as set forth in claim 17 wherein said valve member includes a body having an outer surface means for defining an annular recess having a bottom surface of a first diameter and shoulder which extends outwardly from said bottom surface to a second diameter which is greater than said first diameter, said shoulder being disposed axially outwardly of and coaxial with said bottom surface, said locking means includes detent means for engaging said shoulder to hold said valve member against movement from the closed position to the open position.

22. A socket assembly as set forth in claim 21 wherein said annular recess includes a sloping camming ramp between said bottom surface and the outer diameter of said shoulder, said camming ramp being effective to disengage said locking elements from said valve member upon the application of an inwardly directed force to said valve member by the plug element.

23. A socket assembly as set forth in claim 14 further including seal means coacting between said valve member and said socket body.

24. A socket assembly as set forth in claim 23 wherein said seal means is a resilient ring member disposed in a recess in said socket body for sealing engagement between said recess and said valve member in response to fluid pressure in a conduit associated with said socket assembly.

25. A socket assembly as set forth in claim 24 wherein said recess is defined by first and second walls in said socket body each having an aperture for movement of said valve member axially relative thereto and between which walls said ring member is disposed, the diameter of the aperture of said first wall being greater than the diameter of the aperture of said second wall, and said first wall being positioned closest to the conduit associated with said socket assembly.

26. A socket assembly as set forth in claim 25 in which said first and second walls are integral with said socket body.

27. A socket assembly as set forth in claim 25 in which said socket body comprises a first socket portion connected to the conduit, and a second socket portion, said first and second socket portions being threadedly secured together and wherein said second wall is formed by a separate rigid washer clamped between said first and second portions, and said first wall is integral with said first socket portion.

28. A socket assembly for receiving a plug element to connect a conduit associated with said socket assembly in fluid communication with a conduit associated with the plug element, said socket assembly comprising a socket body adapted to be connected with a conduit and defining a valve chamber having an outer end portion through which the plug element is inserted, a valve member disposed in said valve chamber and movable axially in said valve chamber from a closed position blocking fluid flow through said valve chamber to an open position enabling fluid to flow through said valve chamber, and locking means for engaging said valve member and holding it against axial movement when said valve member is in the closed position and for engaging the plug element and holding it against axial movement when said valve member is in the open position, said valve member includes a body having an outer surface means for defining an annular recess having a bottom surface of a first diameter and shoulder which extends outwardly from said bottom surface to a second diameter which is greater than said first diameter, said shoulder being disposed axially outwardly of and coaxial with said bottom surface, said annular recess including a sloping camming ramp between said bottom surface and the outer diameter of said shoulder, said locking means including detent means for engaging said shoulder to hold said valve member against movement from the closed position to the open position, said camming ramp being effective to disengage said locking elements from said valve member upon the application of an inwardly directed force to said valve member by the plug element.

29. A socket assembly as set forth in claim 28 wherein said locking means includes a plurality of ball elements disposed in a circular array in openings in said socket body, each of said ball elements being movable relative to said socket body under the influence of said camming ramp to a disengaged condition in which each of said ball elements is ineffective to hold said valve member in the closed position and in which each of said ball elements is ineffective to hold the plug element against axial movement, each of said ball elements being movable relative to said socket body to a first engaged condition in which each of said ball elements is in abutting engagement with said annular recess in said valve member and is effective to hold said valve member in the closed position against the influence of axial forces applied to said valve member, each of said ball elements being movable relative to said socket body to a second engaged condition in which each of said ball elements is in abutting engagement with the plug element and is effective to hold the plug element against axial movement relative to the socket body.

30. A socket assembly as set forth in claim 29 wherein said locking means further includes a sleeve circumscribing the circular array of ball elements, said sleeve being axially movable relative to said socket body to a first locking condition in which said sleeve is effective to hold said ball elements in said first engaged condition, said sleeve being axially movable relative to said socket body to a second locking condition in which said sleeve is effective to hold said ball elements in said second engaged condition, said sleeve being movable relative to said socket body to an unlocking condition in which said sleeve is ineffective to hold said ball elements in an engaged condition.

31. A socket assembly as set forth in claim 29 wherein said ball elements are disposed outwardly of said valve chamber when said ball elements are in said disengaged condition, said ball elements extending a first distance into said valve chamber when said ball elements are in said first engaged condition, said ball elements extending a second distance into said valve chamber when said ball elements are in said second engaged condition, said second distance being greater than said first distance.

32. A socket assembly as set forth in claim 29 wherein said locking means further includes a sleeve circumscribing the circular array of ball elements, said sleeve being movable relative to said socket body to a first position in which said sleeve is ineffective to press said ball elements into said valve chamber to enable said ball elements to move to said disengaged condition, said sleeve being movable relative to said socket body to a second position in which said sleeve is effective to hold said ball elements in positions in which they extend said first distance into valve chamber, said sleeve being movable relative to said socket body to a third position in which said sleeve is effective to hold said ball elements in positions in which they extend said second distance into said valve chamber.

33. A socket assembly for receiving a plug element to connect a conduit associated with said socket assembly in fluid communication with a conduit associated with the plug element, said socket assembly comprising a socket body adapted to be connected with a conduit and defining a valve chamber having an outer end portion through which the plug element is inserted, a valve member disposed in said valve chamber and movable axially in said valve chamber from a closed position blocking fluid flow through said valve chamber to an open position enabling fluid to flow through said valve chamber, seal means coacting between said valve member and socket body, said seal means including a resilient ring member disposed in a recess in said socket body for sealing engagement between said recess and said valve member in response to fluid pressure in said conduit associated with said socket assembly, said recess is defined by first and second walls in said socket body each having an aperture for movement of said valve member axially relative thereto and between which walls said ring member is disposed, the diameter of the aperture of said first wall being greater than the diameter of the aperture of said second wall, and said first wall being positioned closest to the conduit associated with said socket assembly, and locking means for engaging said valve member and holding it against axial movement when said valve member is in the closed position and for engaging the plug element and holding it against axial movement when said valve member is in the open position.

34. A socket assembly as set forth in claim 33 in which said first and second walls are integral with said socket body.

35. A socket assembly as set forth in claim 33 in which said socket body comprises a first socket portion connected to said conduit, and a second socket portion, said first and second socket portions being threadedly secured together and wherein said second wall is formed by a separate rigid washer clamped between said first and second socket portions, and said first wall is integral with said first socket portion.

36. A socket assembly for receiving a plug element to connect a conduit associated with said plug element in fluid communication with a conduit associated with said socket assembly, said socket assembly comprising a base section adapted to be connected with a conduit and having an open outer end portion, said base section having a transverse surface extending tranversely to a central axis of said open outer end portion and spaced apart from said open outer end portion, an internal thread convolution formed in said base section and disposed between said open outer end portion and said transverse inner surface, a wall member formed separately from said base section and disposed in abutting engagement with said transverse inner surface on said base section, said wall member having a central opening disposed in a coaxial relationship with said open outer end portion of said base section, a second section, an external thread convolution formed on said second section and disposed in threaded engagement with said internal thread convolution on said base section, said internal and external thread convolutions cooperating to clamp said wall member between said second section and said transverse inner surface on said base section to thereby hold said wall member against movement relative to said base and second sections, said base and second sections cooperating to at least partially define a valve chamber, a valve member disposed in said valve chamber and extending through the central opening in said wall member, said valve member being movable in said valve chamber between a closed position blocking fluid flow through said valve chamber and an open position enabling fluid to flow through said valve chamber, said base section including surface means defining a recess which is open on a first side toward the open end position of said base section and is open on a second side toward a central axis of the valve chamber, an annular seal member disposed in said recess and extending through said open second side of said recess into sealing engagement with said valve member, said wall member being effective to at least partially block said open first side of said recess to retain said seal member in said recess, and locking means for engaging the plug element and holding it against axial movement when said valve member is in the open position.

37. A socket assembly for receiving a plug element to connect a conduit associated with said plug element in fluid communication with a conduit associated with said socket assembly, said socket assembly comprising a base section adapted to be connected with a conduit and having an open outer end portion, said base section having a transverse surface extending transversely to a central axis of said open outer end portion and spaced apart from said open outer end portion, an internal thread convolution formed in said base section and disposed between said open end portion and said transverse inner surface, a wall member formed separately from said base station and disposed in abutting engagement with said transverse inner surface on said base section, said wall member having a central opening disposed in a coaxial relationship with said open outer end portion of said base section, a second section, an external thread convolution formed on said second section and disposed in threaded engagement with said internal thread convolution on said base section, said internal and external thread convolutions cooperating to clamp said wall member between said second section and said transverse inner surface on said base section to thereby hold said wall member against movement relative to said base and second sections, said base and second sections cooperating to at least partially define a valve chamber, a valve member disposed in said valve chamber and extending through the central opening in said wall member, said valve member being movable in said valve chamber between a closed position blocking fluid flow through said valve chamber and an open position enabling fluid to flow through said valve chamber, and locking means for engaging the plug element and holding it against axial movement when said valve member is in the open position, said locking means engaging said valve member and holding it against axial movement when said valve member is in the closed position.

38. A socket assembly as set forth in claim 37 wherein said wall member has a pair of flat parallel major side surfaces interconnected by a pair of cylindrical parallel minor side surfaces, a first one of said flat major side surfaces of said wall member being disposed in abutting engagement with said transverse inner surface on said base section, a second one of said flat major side surfaces of said wall member being disposed in abutting engagement with an end of said second section, a first one of said cylindrical minor side surfaces being disposed in engagement with a cylindrical inner surface of said base section, said second cylindrical minor side surface of said wall member defining the central opening in said wall member and circumscribing said valve member.

* * * * *